United States Patent
Ahmad et al.

(10) Patent No.: US 11,951,654 B2
(45) Date of Patent: *Apr. 9, 2024

(54) PASSIVE BARRIER LAYER PLACEMENT WITHIN CARBONATED BEVERAGE CONTAINER WALL TO IMPROVE SHELF-LIFE

(71) Applicant: AMCOR RIGID PACKAGING USA, LLC, Ann Arbor, MI (US)

(72) Inventors: Farhan Ahmad, Canton, MI (US); William J. Dubuque, Dexter, MI (US); John Brace, Saline, MI (US)

(73) Assignee: AMCOR RIGID PACKAGING USA, LLC, Ann Arbor, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/771,481

(22) PCT Filed: Dec. 13, 2017

(86) PCT No.: PCT/US2017/066168
§ 371 (c)(1),
(2) Date: Jun. 10, 2020

(87) PCT Pub. No.: WO2019/117895
PCT Pub. Date: Jun. 20, 2019

(65) Prior Publication Data
US 2021/0086401 A1    Mar. 25, 2021

(51) Int. Cl.
*B29B 11/14* (2006.01)
*B29C 49/00* (2006.01)
(Continued)

(52) U.S. Cl.
CPC .......... *B29B 11/14* (2013.01); *B29C 49/0005* (2013.01); *B32B 1/02* (2013.01);
(Continued)

(58) Field of Classification Search
CPC .. B32B 1/02; B32B 1/08; B32B 27/32; B32B 27/34; B32B 27/36; B32B 2250/03;
(Continued)

(56) References Cited

U.S. PATENT DOCUMENTS 4,565,851 A    1/1986  Barbee
4,835,214 A *  5/1989  Shepherd ................ C08L 67/02
                                                        525/931

(Continued)

FOREIGN PATENT DOCUMENTS

CO    4520197 A1   10/1997
CO    6700882 A2    6/2013
(Continued)

OTHER PUBLICATIONS

Colombian Office Action issued in corresponding Colombian Patent Application No. NC2020/0008480 dated Aug. 26, 2022.
(Continued)

*Primary Examiner* — Aaron Austin
*Assistant Examiner* — Thomas J Kessler
(74) *Attorney, Agent, or Firm* — Harness, Dickey & Pierce, P.L.C.

(57) ABSTRACT

A preform configured to form a carbonated beverage container. The preform includes a finish defining an opening. A body portion of the preform extends from the finish. A bottom portion of the preform is at an end of the preform opposite to the finish. A longitudinal axis of the preform extends through an axial center of the bottom portion. A base layer is included with the body portion and the bottom portion. The base layer has an inner portion with an inner surface at a carbonated product side of the preform. An outer portion of the base layer has an outer surface at an outer bottle side of the preform. A passive CO2 barrier layer is between the inner portion and the outer portion of the base
(Continued)

layer. The passive CO2 barrier layer extends along the body portion to the bottom portion, and across the bottom portion. The passive CO2 barrier layer is arranged closer to the inner surface than the outer surface to increase the shelf-life of carbonated products.

10 Claims, 8 Drawing Sheets

(51) Int. Cl.
  *B29K 67/00* (2006.01)
  *B29L 31/00* (2006.01)
  *B32B 1/02* (2006.01)
  *B32B 1/08* (2006.01)
  *B32B 27/32* (2006.01)
  *B32B 27/34* (2006.01)
  *B32B 27/36* (2006.01)
  *B65D 1/02* (2006.01)

(52) U.S. Cl.
  CPC .............. *B32B 27/32* (2013.01); *B32B 27/34* (2013.01); *B32B 27/36* (2013.01); *B65D 1/0215* (2013.01); *B65D 1/0223* (2013.01); *B65D 1/0261* (2013.01); *B29C 2949/3016* (2022.05); *B29C 2949/302* (2022.05); *B29C 2949/3032* (2022.05); *B29K 2067/003* (2013.01); *B29K 2067/043* (2013.01); *B29K 2995/0067* (2013.01); *B29L 2031/7158* (2013.01); *B29L 2031/717* (2013.01); *B32B 1/08* (2013.01); *B32B 2250/03* (2013.01); *B32B 2307/7242* (2013.01); *B32B 2439/60* (2013.01)

(58) Field of Classification Search
  CPC ........ B32B 2307/7242; B32B 2439/60; B32B 3/04; B32B 3/263; B32B 3/30; B32B 27/08; B32B 27/20; B32B 27/308; B32B 2250/24; B32B 2250/244; B32B 2250/44; B32B 2270/00; B32B 2307/718; B32B 2439/70; B29B 11/14; B29B 2911/1408; B29B 2911/14093; B65D 1/02; B65D 1/0207; B65D 1/0215; B65D 1/0223; B65D 1/023; B65D 1/0261; B65D 1/0284; B29C 49/0005; B29C 49/071; B29C 2949/0715; B29C 2949/22; B29C 2949/3016; B29C 2949/302; B29C 2949/3032; B29K 2067/003; B29K 2067/043; B29K 2995/0067; B29L 2031/7158; B29L 2031/717
  See application file for complete search history.

(56) References Cited

U.S. PATENT DOCUMENTS

| | | | |
|---|---|---|---|
| 5,077,111 A * | 12/1991 | Collette | B29C 49/22 428/36.7 |
| 5,628,957 A | 5/1997 | Collette et al. | |
| 6,123,211 A * | 9/2000 | Rashid | B29D 23/001 215/12.2 |
| 6,217,818 B1 | 4/2001 | Collette et al. | |
| 6,312,641 B1 | 11/2001 | Hutchinson | |
| 11,390,416 B2 * | 7/2022 | Dubuque | B29C 45/16 |
| 2002/0192404 A1 * | 12/2002 | Swenson | B29C 45/1646 428/34.1 |
| 2005/0011892 A1 * | 1/2005 | Nakajima | B29C 49/221 220/62.22 |
| 2005/0053739 A1 | 3/2005 | Lee et al. | |
| 2005/0084635 A1 * | 4/2005 | Bourgeois | B32B 7/10 428/35.7 |
| 2005/0139566 A1 | 6/2005 | Uesugi et al. | |
| 2006/0099363 A1 | 5/2006 | Farha | |
| 2008/0061474 A1 | 3/2008 | Bourgeois et al. | |
| 2008/0071012 A1 * | 3/2008 | Bourgeois | C08K 5/49 524/115 |
| 2008/0258355 A1 * | 10/2008 | Mehta | C08J 3/005 525/437 |
| 2014/0327176 A1 | 11/2014 | Chiba et al. | |
| 2019/0315018 A1 † | 10/2019 | Galt | |

FOREIGN PATENT DOCUMENTS

| | | |
|---|---|---|
| CO | 2016/0004003 | 5/2019 |
| EP | 1498355 A4 | 5/2006 |
| EP | 1651526 B1 † | 3/2016 |
| JP | S61273927 A | 12/1986 |
| JP | S62164504 A | 7/1987 |
| WO | 2005014409 A1 | 2/2005 |
| WO | WO-2009079724 A2 | 7/2009 |
| WO | 2015157563 A1 | 10/2015 |

OTHER PUBLICATIONS

Colombian Office Action regarding Application No. NC20200008480, dated Aug. 25, 2022.
European Office Action regarding Application No. 17934384.3, dated Sep. 28, 2022.
International Search Report and Written Opinion of the ISA issued in PCT/US2017/066168, dated Sep. 12, 2018; ISA/KR.
Supplemental European Search Report issued in corresponding European Application No. 17934384 dated Jul. 5, 2021 (6 pages).

\* cited by examiner
† cited by third party

| Barrier (wt. %) | Shelf-Life (weeks) (Barrier Layer Furthest From Product Side) | Shelf-Life (weeks) (Barrier Layer Closest to Product Side) | Shelf-Life Improvement Realized By Moving Barrier Layer Closest to Product Side (weeks) | Slope |
|---|---|---|---|---|
| 1% PGA | 6.4 | 7.4 | 1 | 0.018 |
| 2% PGA | 7.5 | 9.7 | 2.2 | 0.039 |
| 5% PGA | 10.6 | 15.7 | 5.1 | 0.093 |
| 5% MXD6 | 9.9 | 14.0 | 4.1 | 0.075 |
| 5% PEF | 5.9 | 7.3 | 1.4 | 0.025 |

*FIG - 7A*

| Barrier (wt. %) | Shelf-Life (weeks) (Barrier Layer Furthest From Product Side) | Shelf-Life (weeks) (Barrier Layer Closest to Product Side) | Shelf-Life Improvement Realized By Moving Barrier Layer Closest to Product Side (weeks) | Slope |
|---|---|---|---|---|
| 2% PGA | 1.4 | 1.9 | 0.5 | 0.009 |
| 5% PGA | 1.8 | 2.9 | 1.1 | 0.020 |
| 5% MXD6 | 1.6 | 2.5 | 0.9 | 0.016 |
| 5% PEF | 1.3 | 1.6 | 0.5 | 0.009 |

*FIG - 7B*

| PGA Barrier (wt. %) | Shelf-life (weeks) (Barrier Layer Furthest From Product Side) | Shelf-life (weeks) (Barrier Layer Closest to Product Side) | Shelf-life improvement (weeks) |
|---|---|---|---|
| 1 | 6.4 | 7.4 | 1 |
| 2 | 7.5 | 9.7 | 2.2 |
| 5 | 10.6 | 15.7 | 5.1 |
| 10 | 15 | 23 | 8.0 |
| 30 | 28 | 37.5 | 9.5 |
| 40 | 42 | 33 | 9.0 |

PASSIVE BARRIER LAYER PLACEMENT WITHIN CARBONATED BEVERAGE CONTAINER WALL TO IMPROVE SHELF-LIFE

CROSS-REFERENCE TO RELATED APPLICATION

This application is a U.S. National Phase Application under 35 U.S.C. 371 of International Application No. PCT/US2017/066168 filed on Dec. 13, 2017, the entire disclosure of which is incorporated herein by reference.

FIELD

The present disclosure relates to passive barrier layer placement within a carbonated beverage container's wall to improve shelf-life.

BACKGROUND

This section provides background information related to the present disclosure, which is not necessarily prior art.

While current carbonated polyethylene terephthalate (PET) beverage containers are suitable for their intended use, they are subject to improvement. For example, one of the major challenges for the beverage industry is to extend the shelf-life of carbonated products while maintaining their original characteristics and quality. Current solutions for increasing the shelf-life of carbonated beverage products are based on improving container design with higher weight or crystallinity, applying Nylon (MXD6) as a blend or multi-layer or Plasmax or amorphous carbon coating, such as the following list of passive barriers for $CO_2$ gas, which can be used in pure format or blended with PET before being injected as a barrier layer within a PET wall: Polyglycolic Acid (PGA); Polyethylene Furanoate (PEF); Poly(trimethylene Furan-2,5-Dicarboxylate) (PTF); Poly(Neopentyl Glycol 2,5-Furanoate) (PNF); Polyethylene Naphthalate (PEN); (PEN)/PET Co-Polymer; Polytrimethylene Naphthalate (PTN); Polybutylene Naphthalate (PBN); Polyacrylonitrile (PAN); Nanoclay; MXD6 (Nylon); Nano Nylon-MXD6; MXD6 (Nylon); and Polybutadiene Mixture.

Current solutions also present challenges, such as investment in new design, testing and manufacturing bottles, associated cost, haze with Nylon barrier and lack of recyclability. New developments in polyesters such as polyglycolic acid (PGA), polyethylene furanoate (PEF) and poly(trimethylene furan-2,5-dicarboxylate) (PTF) may provide barrier alternatives in terms of bottle clarity, higher gas barrier performance, light-weighting and sustainability etc. During the early resin development phase these novel resins (which also provide $CO_2$ barrier) will be expensive and therefore require innovative means for combining them with PET to achieve cost-performance balance in new beverage container solution development. The present disclosure advantageously includes carbonated PET beverage containers that provide improved shelf-life of carbonated beverages therein. The present disclosure provides numerous additional advantages and unexpected results, as one skilled in the art will recognize.

SUMMARY

This section provides a general summary of the disclosure, and is not a comprehensive disclosure of its full scope or all of its features.

The present disclosure includes a preform configured to form a carbonated beverage container. The preform includes a finish defining an opening. A body portion of the preform extends from the finish. A bottom portion of the preform is at an end of the preform opposite to the finish. A longitudinal axis of the preform extends through an axial center of the bottom portion. A base layer is included with the body portion and the bottom portion. The base layer has an inner portion with an inner surface at a carbonated product side of the preform. An outer portion of the base layer has an outer surface at an outer bottle side of the preform. A passive $CO_2$ barrier layer is between the inner portion and the outer portion of the base layer. The passive $CO_2$ barrier layer extends along the body portion to the bottom portion, and across the bottom portion. The passive $CO_2$ barrier layer is arranged closer to the inner surface than the outer surface.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
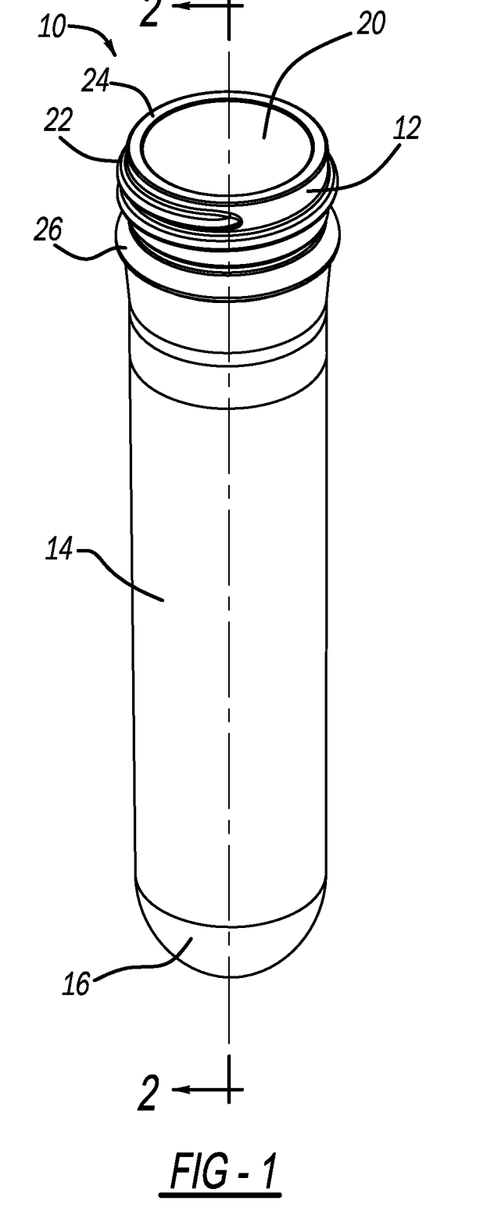
FIG. 1 is a perspective view of a container preform in accordance with the present disclosure.

FIG. 1 illustrates a preform according to the present disclosure at reference numeral 10. The preform 10 is configured to form a container in any suitable manner, such as by injection blow molding. The container formed from the preform 10 can be any container suitable for storing a carbonated beverage, and can have any suitable shape and size. The preform 10 can be formed in any suitable manner, such as by any suitable multi-layer injection molding process.

The preform 10 generally includes a finish portion 12, a body portion 14, and a bottom portion 16. A longitudinal axis A of the preform 10 extends through a radial center of the preform 10 along a length of the preform 10. The body portion 14 is arranged along the longitudinal axis A between the finish portion 12 and the bottom portion 16. The finish portion 12 defines an opening 20. The longitudinal axis A extends through a radial center of the opening 20. The opening 20 provides access to an interior of the preform 10, and to an inner volume defined by a container formed from the preform 10. Extending from an outer surface of the finish portion 12 are threads 22. The threads 22 are configured to cooperate with threads of any suitable closure. Cooperation between threads of the closure and the threads of the finish portion 12 secures the closure to a top sealing surface 24 of the finish portion 12 in order to seal the container closed. The threads 22 are between the top sealing surface 24 and a support flange 26, which extends outward and is configured to support the preform 10 in any suitable blow molding equipment as the preform 10 is blow molded into a container.

The body portion 14 of the preform 10 is configured to be blow molded into a body portion of the container, and the bottom portion 16 is configured to be blow molded into a base portion of the container. The body portion 14 can be configured in any suitable manner to provide the resulting container with any suitable body portion having any suitable size, shape, and surface features, such as any suitable panels and ribs configured to absorb vacuum or pressure forces. The bottom portion 16 can be configured to provide the resulting container with any suitable base portion having any suitable size, shape, and surface features, such as surface features configured to absorb vacuum forces and/or to facilitate movement of the base to absorb vacuum forces. The base portion of the container can be any suitable base portion known in the art, such as any suitable flexible base portion configured to absorb vacuum forces that may be present in the container, such as during a hot fill-process.

Figure 2:
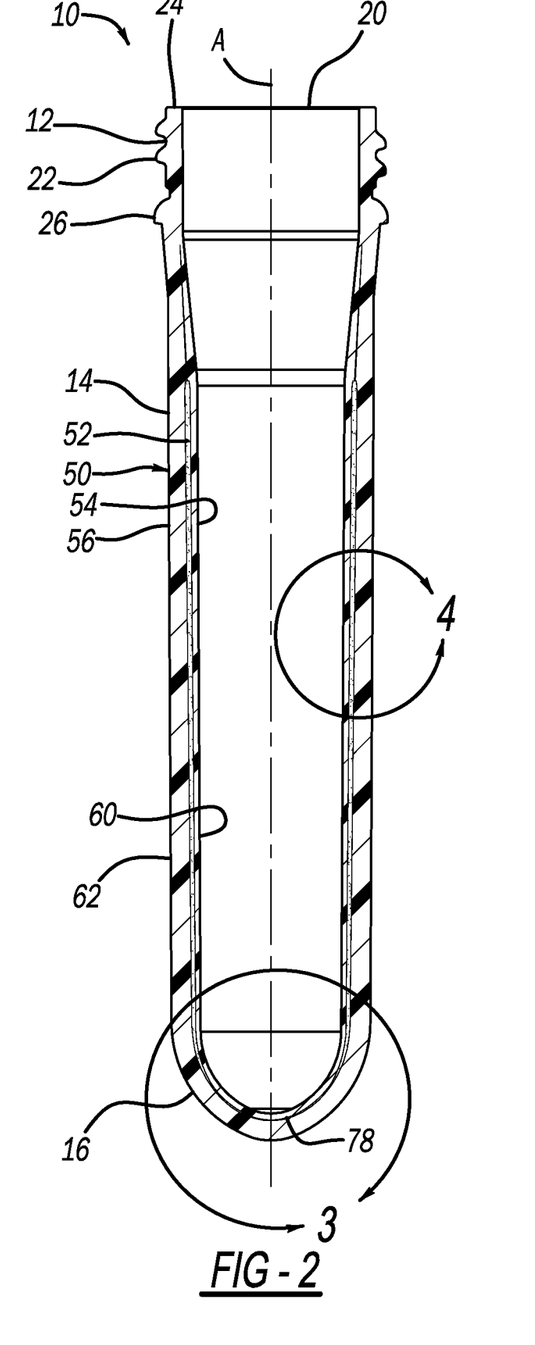
FIG. 2 is a cross-sectional view taken along line 2-2 of FIG. 1.

FIG. 2 is a cross-sectional view of the preform 10. Each one of the finish portion 12, the body portion 14, and the bottom portion 16 is formed by a base layer 50. The base layer 50 can be made of any suitable material, such as any suitable polyethylene terephthalate (PET) material. At least one passive carbon dioxide ($CO_2$) barrier layer 52, blended with PET or not blended with PET, is arranged within the base layer 50. Any suitable passive $CO_2$ barrier layer 52 can be used, such as, but not limited to the following: polyglycolic acid (PGA) (non-blended with polyethylene terephthalate (PET)); polyethylene furanoate (PEF) (non-blended with PET); poly(trimethylene furan-2,5-Dicarboxylate) (PTF) (non-blended with PET); Poly(Neopentyl Glycol 2,5-Furanoate) (PNF) (non-blended with PET); Polyethylene Naphthalate (PEN) (non-blended with PET); (PEN)/PET Co-Polymer (non-blended with PET); Polytrimethylene Naphthalate (PTN) (non-blended with PET); polybutylene naphthalate (PBN) (non-blended with PET); polyacrylonitrile (PAN) (non-blended with PET); nanoclay (blended with PET or not blended with PET); MXD6 (Nylon) (blended with PET or not blended with PET); nano nylon-MXD6 (blended with PET or not blended with PET); MXD6 (Nylon) and Polybutadiene Mixture (blended with PET or not blended with PET). These different barrier layers 52 can therefore be used in pure format or can be blended with PET (as indicated above) before being injected as the barrier layer 52 within the base layer 50.

Figure 3:
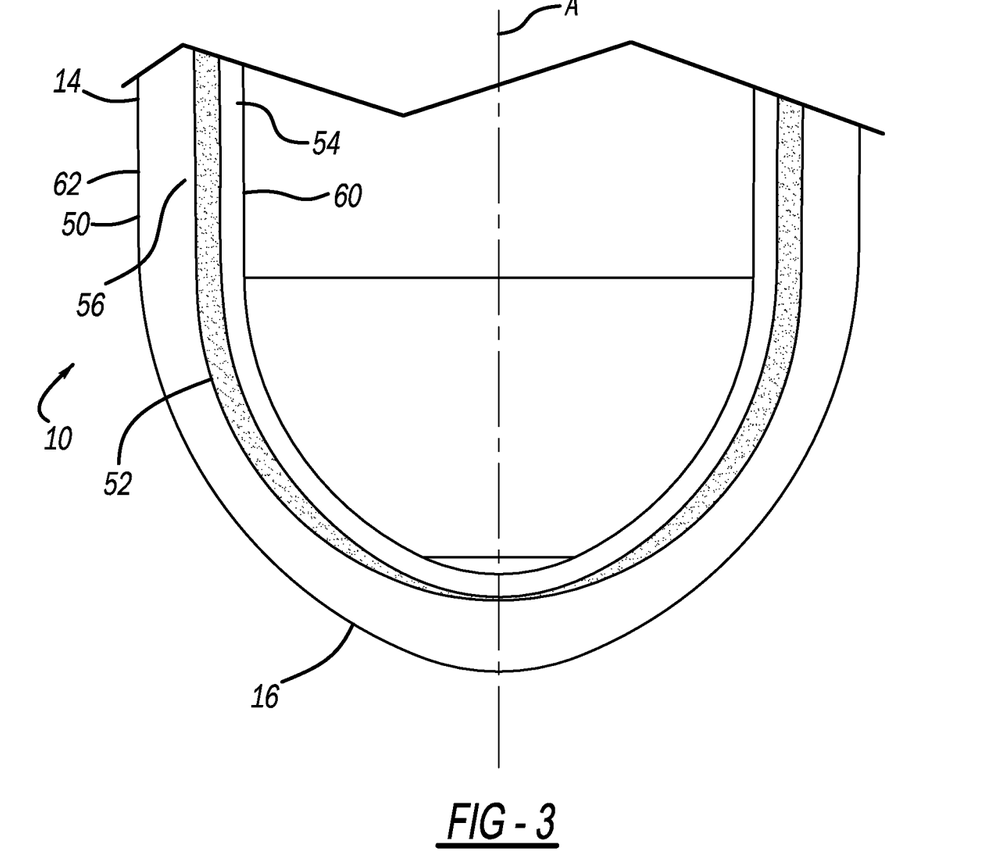
FIG. 3 illustrates area 3 of FIG. 2.

The barrier layer 52 is arranged between an inner portion 54 and an outer portion 56 of the base layer 50. The inner portion 54 has an inner surface 60, which defines an interior volume of the preform 10 and the resulting container. The inner surface 60 is thus at a carbonated product side. The outer portion 56 has an outer surface 62, which is at an outer bottle side. The barrier layer 52 extends from anywhere along the preform body portion 14 or finish portion 12, such as from about the support flange 26, across the body portion 14, and both to and across the bottom portion 16. As illustrated in FIG. 3, the barrier layer 52 may generally taper inward toward the longitudinal axis A as the oxygen barrier layer 52 extends away from the support flange 26 and towards the bottom portion 16.

Figure 4:
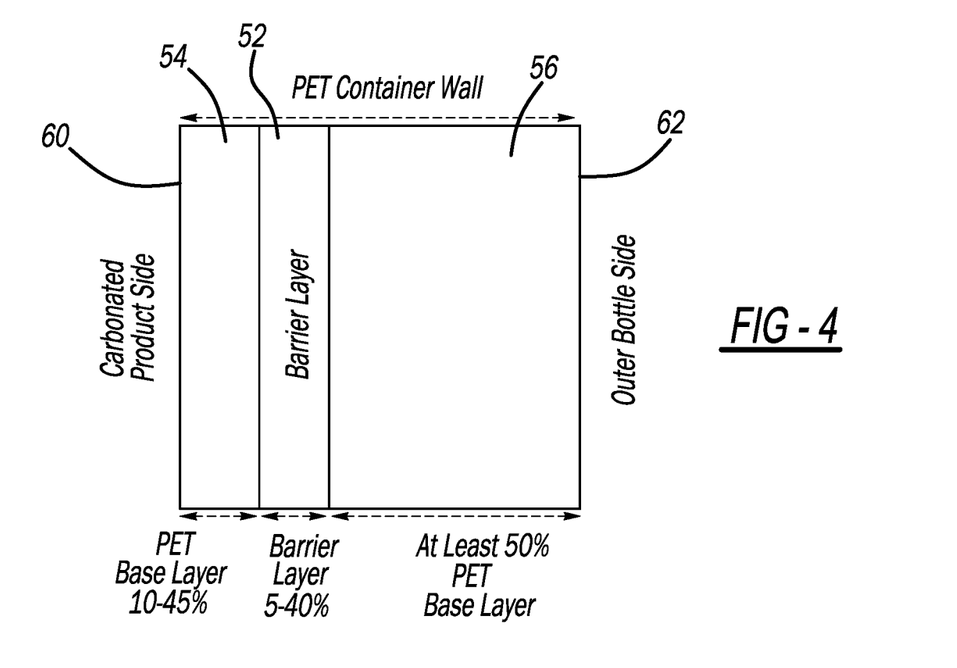
FIG. 4 illustrates area 4 of FIG. 2.

FIG. 4 illustrates the position of the barrier layer 52 relative to the inner portion 54 and the outer portion 56 of the base layer 50 in a container formed from the preform 10. The barrier layer 52 is arranged such that it is closer to the inner surface 60 of the base layer 50 than to the outer surface 62 of the base layer 50. Thus, the outer portion 56 of the base layer 50 is thicker than the inner portion 54 of the base layer 50. In the example illustrated, the outer portion 56 is at least 50 wt. % of the overall thickness of the container wall, and the inner portion 54 is between 10 to 45 wt. % of the overall thickness of the container wall. The barrier layer 52 is 5 to 40 wt. % of the overall thickness of the container wall.

Figure 5:
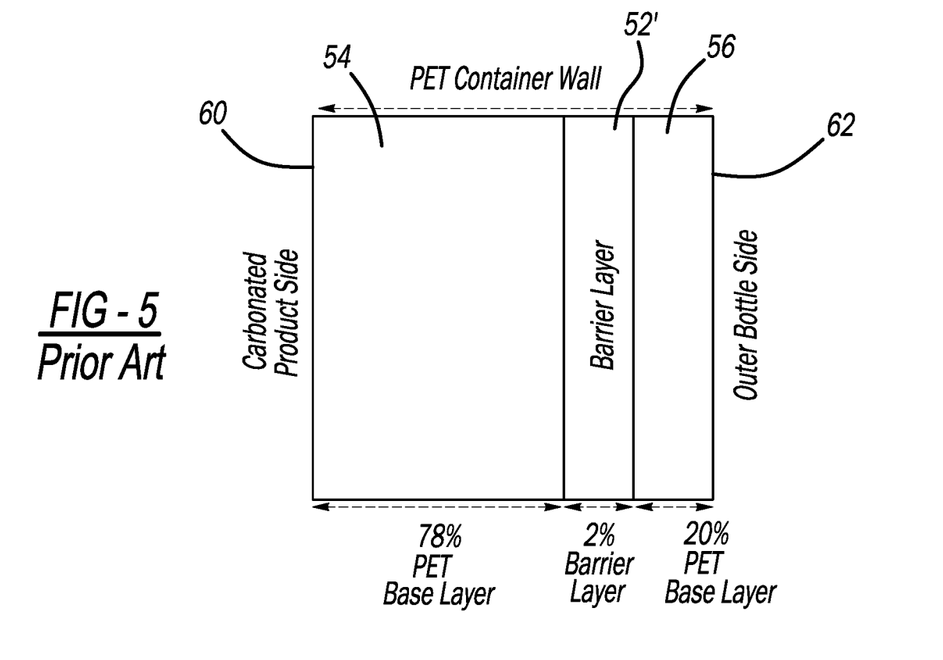
FIG. 5 illustrates a prior art configuration of a preform sidewall.

The position of the barrier layer 52 in accordance with the present disclosure is arranged closer to the inner surface 60 (which is at the carbonated product side), as compared to the prior art barrier layer 52' illustrated in FIG. 5. With reference to FIG. 5, prior art barrier 52' is closer to the outer surface 62 of the base layer 50 than to the inner surface 60. In the prior art example of FIG. 5, the inner portion 54 of the base layer 50 is thicker than the outer portion 56 of the base layer 50. More specifically, in the prior art example illustrated in FIG. 5 the outer portion 56 is 20 wt. % of the overall thickness of the container wall, and the inner portion 54 is 78 wt. % of the overall thickness of the container wall. The barrier layer 52 is 2 wt. % of the overall thickness of the container wall.

The present teachings advantageously increase the shelf-life of carbonated PET beverage containers of various sizes from 8 oz to 2 L (preferably from 8 oz to 20 oz) by placing passive barrier layer 52 closer to the inner surface 60 (the carbonated product side) as compared to the outer surface 62 of the base layer 50. Implementation of this concept is demonstrated by simulating the shelf-life of PET containers containing the passive barrier layer 52 (e.g., Polyglycolic acid (PGA), Nylon (MXD6), Polyethylene furanoate (PEF), etc. as set forth above) within various positions in their base layers 50. Shelf-life simulation was performed for various conditions including, barrier type and concentration, size and weight of the container, gas fill volume, storage temperature and humidity and barrier position within PET wall. Based on M-Rule® analysis (M-Rule® is permeation modeling technology provided by Container Science, Inc.), shelf-life is not only dependent on these selected parameters, but also on the position of the barrier layer 52 within base layer 50. Additionally, maximum shelf-life improvement (realized by positioning the barrier layer 52 so that it is closer to the inner surface 60 (carbonated product side) than the outer surface 62 (outer bottle side)) is dependent on an optimum concentration of the barrier layer 52. As an example, maximum shelf-life improvement for an 8 oz container can be achieved with approximately 10 wt. % PGA concentration. Increasing PGA concentration (>10 wt. %) would not allow the benefit of cost and performance (see FIG. 9 described herein). This concept also extends to other barrier types and container types and sizes albeit the optimum barrier concentration for maximum shelf-life improvement may be different for each case. Advantageously, arrangement of the barrier layer 52 closer to the inner surface 60 than the outer surface 62 can be accomplished with current preform forming machinery. Therefore, the advantages of the present disclosure can be realized without any major modification to current injection and blow molding machinery.

According to M-Rule® analysis, arranging the barrier layer 52 closer to the inner surface 60 as illustrated in FIG. 4 advantageously improves the shelf-life of carbonated beverages (based on 19% $CO_2$ loss). Specifically, the shelf-life of a small-sized container is improved by 50-60% by placing the barrier layer 52 closest to the inner surface 60 at the carbonated product side. Additionally, targeting the maximum shelf-life improvement may include an optimum barrier concentration (e.g., 10 wt. % PGA for 8 oz (carbonated soft drink (CSD) container), which can be optimized for individual cases. Therefore, the present teachings extend to other barrier types and container types and sizes as well.

Figure 6A:
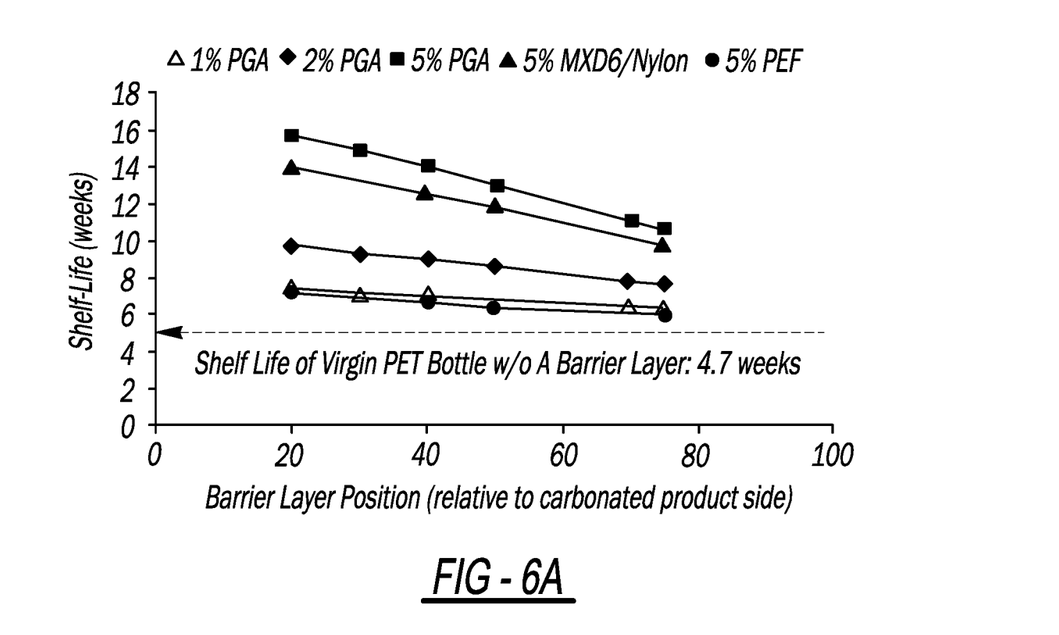
FIG. 6A illustrates shelf-life of various containers in accordance with the present disclosure stored at 23° C. and 50% relative humidity.
Figure 6B:
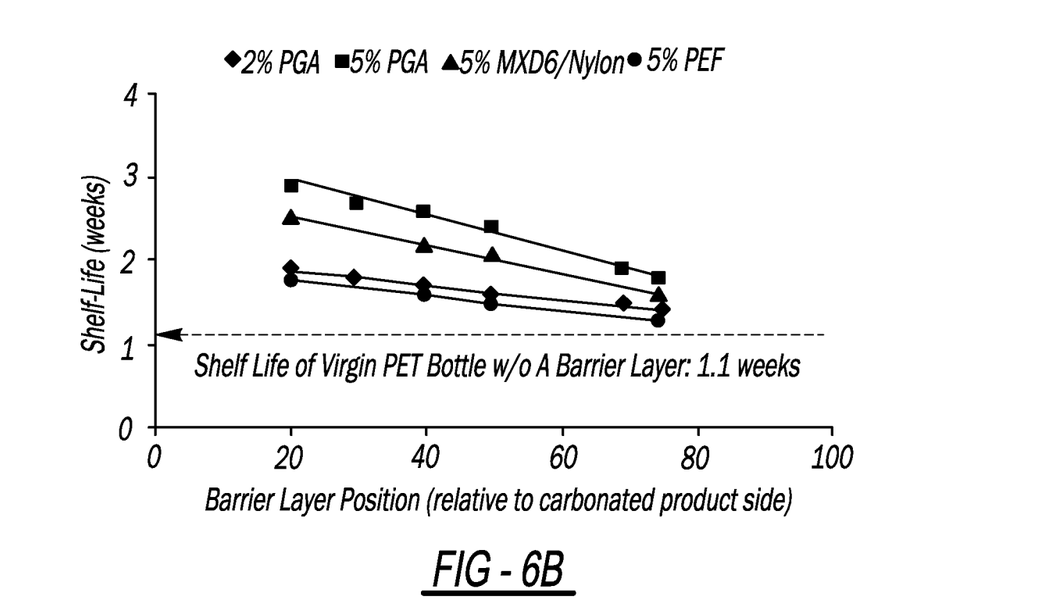
FIG. 6B illustrates shelf-life of various containers in accordance with the present disclosure stored at 38° C. and 50% relative humidity.

FIGS. 6A and 6B illustrate the results of M-Rule® analysis of shelf-life for 8 oz, 13.5 gm containers filled with 4.2 gv of carbonated water under the following two different storage conditions: 23° C., 50% relative humidity (FIG. 6A); and 38° C., 50% relative humidity (FIG. 6B). The effect on shelf-life (19% $CO_2$ loss) of positioning various different barrier layers 52 at different positions relative to the inner surface 60 (carbonated product side) is illustrated. The results indicate that shelf-life can be controlled by manipulating position of the barrier layer 52 within the base layer 50. Maximum shelf-life improvement is achieved by placing the barrier layer 52 closest to the inner surface 60 (carbonated product side) of the base layer 50, and is not dependent on the type or concentration of the barrier layer 52, container size and shape, or storage condition.

Figure 7A:
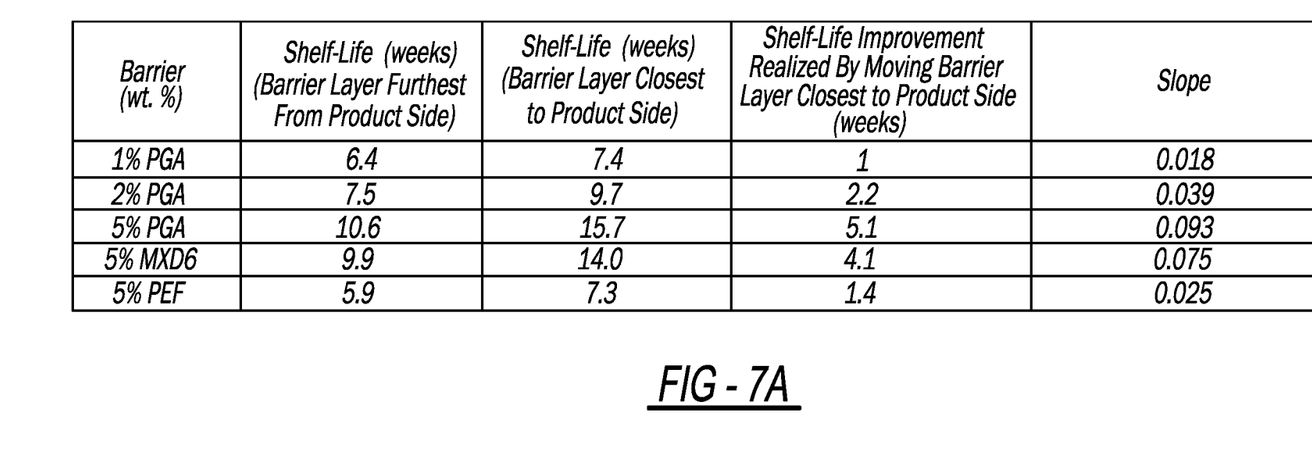
FIG. 7A illustrates shelf-life improvement of various containers in accordance with the present disclosure stored at 23° C. and 50% relative humidity.

FIG. 7A illustrates M-Rule® analysis of shelf-life for an exemplary 8 oz, 13.5 gm beverage container (filled with 4.2 g.v. of carbonated water) stored at 23° C., 50% relative humidity with different passive barriers. FIG. 7A shows that the shelf-life of a carbonated beverage can be increased up to 50% by changing the placement of barrier layer 52 within the base layer 50. Specifically, maximum shelf-life can be achieved by placing the barrier layer 52 closest to the inner surface 60 (carbonated product side). Additionally, the slope calculated from the shelf-life and barrier position layer plot (from FIG. 6A) shows the extent of shelf-life improvement with the barrier layer 52. Higher slope indicates greater shelf-life improvement with respect to placing barrier layer 52 closer to the product contact layer. For example, the 5 wt. % PGA and 5 wt. % MXD6 barrier provides a greater shelf-life improvement than the 2 wt. % PGA and 5 wt. % PEF barrier.

Figure 7B:
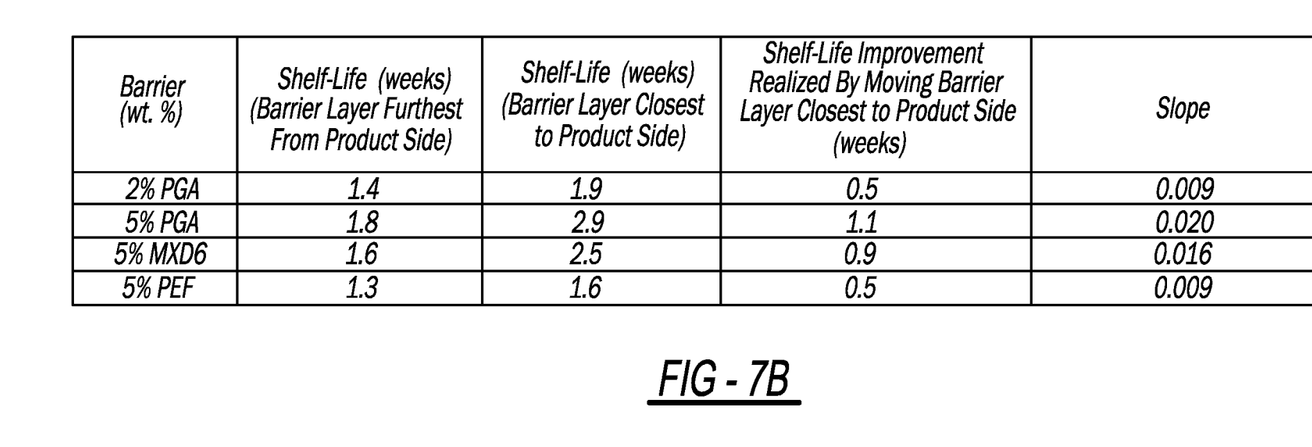
FIG. 7B illustrates shelf-life improvement of various containers in accordance with the present disclosure stored at 38° C. and 50% relative humidity.

FIG. 7B illustrates M-Rule® shelf-life analysis for an exemplary 8 oz, 13.5 gm beverage container (filled with 4.2 g.v of carbonated water) stored at 38° C., 50% relative humidity with different passive barriers. Increasing the storage temperature negatively impacts the shelf-life. Also, carbonated beverage shelf-life can be increased up to 60% by changing the placement of the barrier layer 52 within container's wall (specifically within the base layer 50). Additionally, the slope calculated from the shelf-life and barrier position layer plot (from FIG. 6B) shows the extent of shelf-life improvement with the barrier layer 52. Higher slope indicates greater shelf-life improvement with respect to placing barrier layer 52 closer to the inner surface 60 (closer to the carbonated product side of the base layer 50. For example, 5 wt. % PGA and 5 wt. % MXD6 barrier layers 52 provide greater shelf-life improvement than 2 wt. % PGA and 5 wt. % PEF barrier layers 52.

Figure 8:
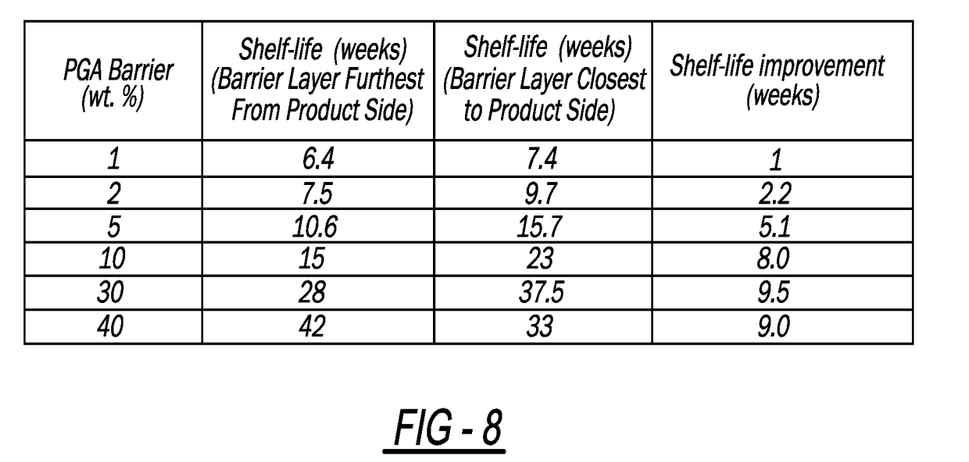
FIG. 8 illustrates shelf-life improvement of various containers in accordance with the present disclosure stored at 23° C. and 50% relative humidity.

FIG. 8 illustrates M-Rule® shelf-life, analysis of an exemplary 8 oz, 13.5 gm beverage container (filled with 4.2 g.v carbonated water) stored at 23° C., 50% relative humidity with increasing concentration of PGA barrier layer 52. It shows that shelf-life can be improved by placing the PGA barrier layer 52 closest to the inner surface 60 (carbonated product side).

Figure 9:
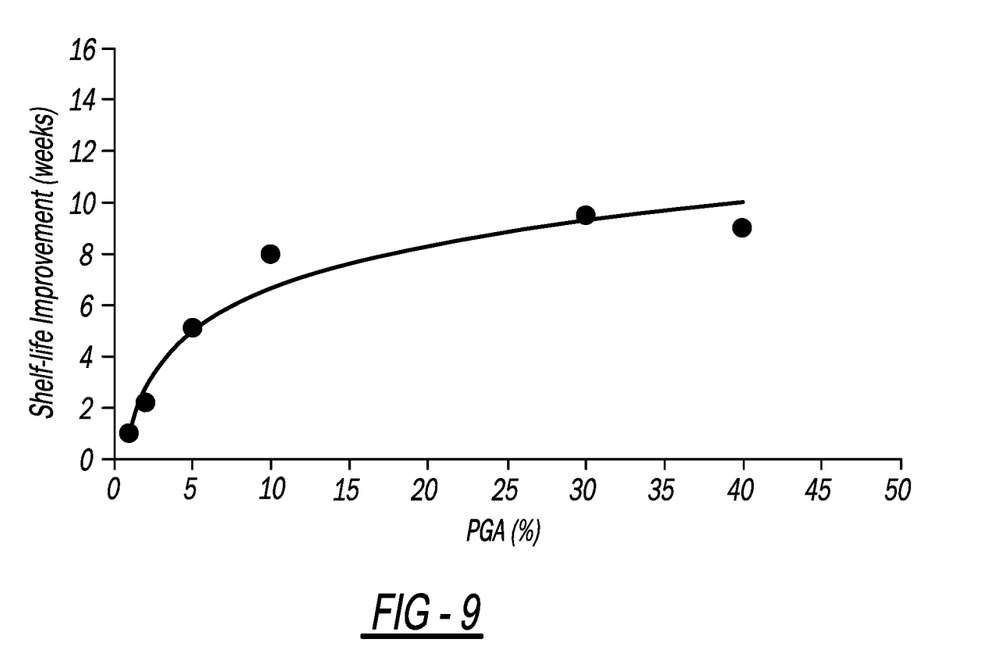
FIG. 9 illustrates shelf-life improvement of various containers in accordance with the present disclosure stored at 23° C. and 50% relative humidity.

FIG. 9 illustrates M-Rule® analysis of shelf-life improvement for an exemplary 8 oz, 13.5 gm carbonated beverage container (filled with 4.2 g.v carbonated water) stored at 23° C., 50% relative humidity with increasing concentration of a PGA barrier layer 52. A shelf live improvement can be achieved with about a 5 to 40 wt. % of PGA barrier layer 52. Optimum shelf-life improvement can be achieved with approximately 10 wt. % of PGA barrier layer 52. Increasing PGA concentration of the barrier layer 52 to more than 40 wt. % does not significantly increase shelf-life. Additionally, higher than 10 wt. % PGA may not provide cost-performance benefit.

Figure 10:
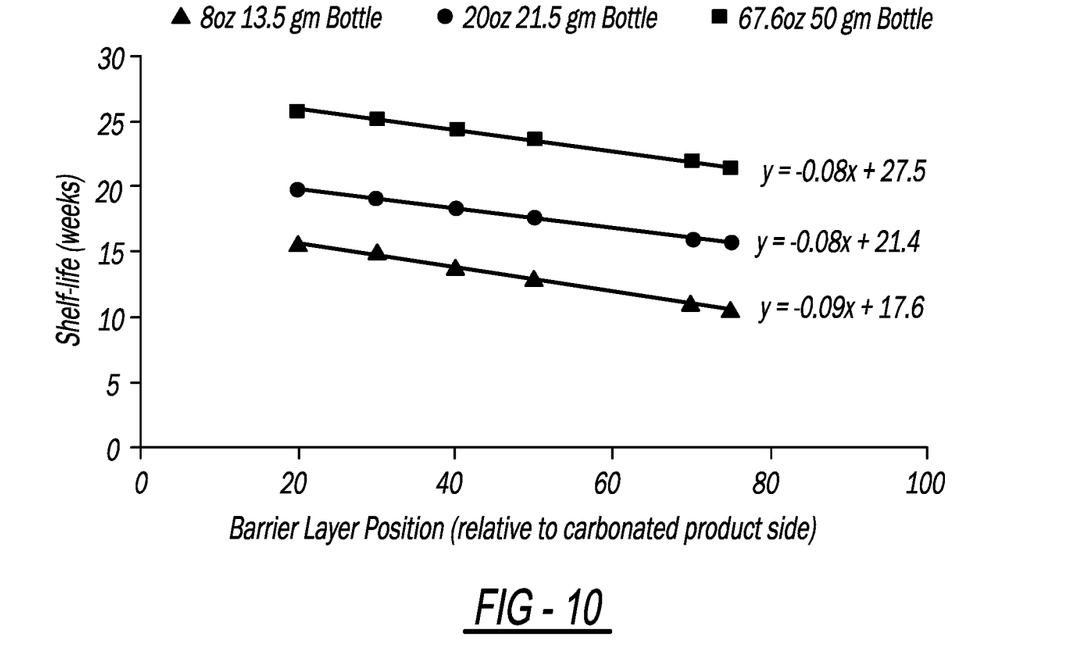
FIG. 10 illustrates shelf-life of various containers in accordance with the present disclosure stored at 23° C. and 50% relative humidity.

FIG. 10 illustrates M-Rule® shelf-life analysis of exemplary carbonated beverage containers having a 5 wt. % PGA barrier layer 52 at various positions within the base layer 50. The containers were filled with 4.2 g.v of carbonated water stored at 23° C., 50% relative humidity. The size and weight of the containers is as follows: 8 oz 13.5 gm; 20 oz 21.5 gm; and 67.6 oz 50 gm. FIG. 10 illustrates that placing the PGA barrier layer 52 closer to the inner surface 60 (carbonated product side) results in an increase in shelf-life. Comparison of the slopes indicates that relatively greater shelf-life improvement can be achieved with smaller-sized carbonated soft drink (CSD) containers.

Figure 11:
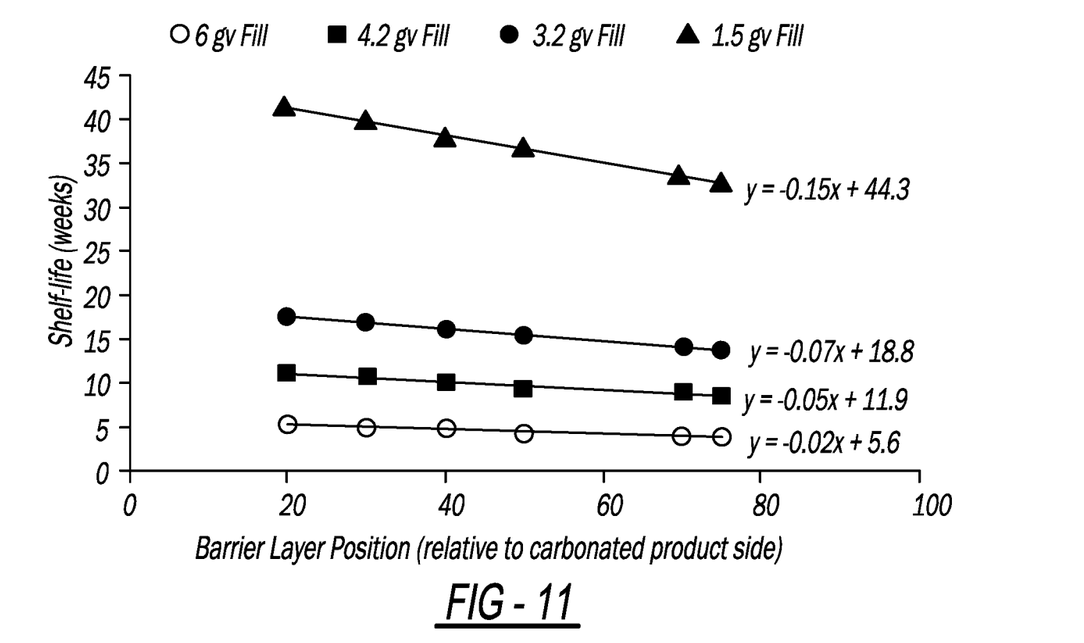
FIG. 11 illustrates shelf-life of various containers in accordance with the present disclosure stored at 23° C. and 50% relative humidity.

FIG. 11 illustrates M-Rule® shelf-life analysis of an exemplary 8 oz, 9.8 gm container filled with carbonated water (carbonation-level ranging from 6 g.v to 1.5 g.v) and stored at 23° C., 50% relative humidity. The effect of positioning a 5 wt. % PGA barrier layer 52 within the container's base layer 50, and changing gas fill volume (specifically 6 g.v., 4.2 g.v. fill, 3.2 g.v. fill, and 1.5 g.v. fill), on shelf-life (19% $CO_2$ loss) is simulated. The results of FIG. 11 show that shelf-life decreases with increasing gas volume. Additionally, the results of FIG. 11 show that shelf-life can be controlled by adjusting position of the barrier layer 52 within the base layer 50 irrespective of initial gas fill volume in beverage container. Based on increasing slope with decreasing gas volume, lower gas fill volume provides increased shelf-life by moving the PGA barrier layer 52 closer to the inner surface 60 (carbonated product side).

Figure 12:
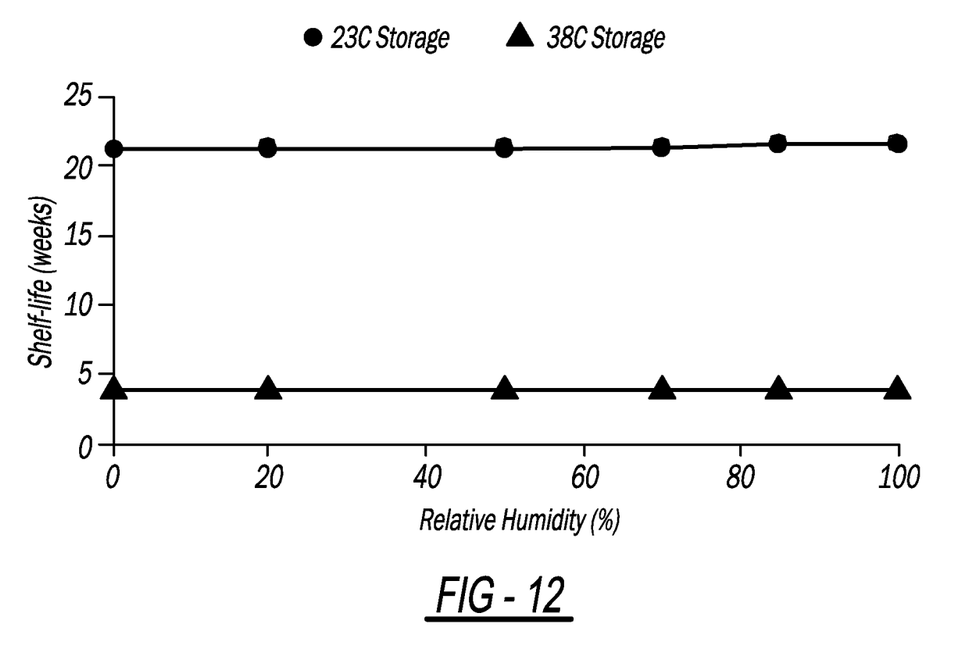
FIG. 12 illustrates shelf-life of various containers in accordance with the present disclosure stored at various different levels of relative humidity.

FIG. 12 illustrates M-Rule® shelf-life analysis of an exemplary 8 oz, 13.5 gm container filled with 4.2 g.v carbonated water subjected to increasing storage temperature and humidity. The container has a barrier layer 52 positioned such that 30 wt. % of the base layer 50 is between the barrier layer 52 and the inner surface 60, and the remaining percentage of the base layer 50 (such as 40 wt. % with the barrier layer 52 being 10 wt. %) is between the barrier layer 52 and the outer surface 62. Thus, the barrier layer 52 is arranged closer to the inner surface 60 than to the outer surface 62. The results illustrated in FIG. 12 show that the shelf-life of the bottle is not impacted much by humidity, but is greatly influenced by temperature (ambient storage temperature provides higher shelf-life). Therefore, a bottle containing a PGA barrier layer 52 arranged closer to the inner surface 60 than the outer surface 62 should be stored at lower temperature condition (preferably ambient) during transportation.

Positioning the barrier layer 52 closer to the inner surface 60 as compared to the outer surface 62 improves shelf-life as a result of barrier molecule distribution and packing. A passive gas barrier works by efficiency packing molecules within the PET base layer 50 to provide improved gas retention. Therefore, if the barrier layer 52 with a fixed concentration is placed closer to the inner surface 60 (the carbonated product side) in the preform 10 (in accordance with the present disclosure), this allows for additional barrier molecules in a given area. Positioning the barrier layer 52 further from the inner surface 60 (carbonated product side) and closer to the outer surface 62 (outer bottle side) leads to higher distribution of barrier molecules and less molecular packing leading to higher gas permeability and lower shelf-life.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A preform configured to form a carbonated beverage container, the preform comprising:
   a finish defining an opening;
   a body portion extending from the finish;
   a bottom portion at an end of the preform opposite to the finish, a longitudinal axis of the preform extends through an axial center of the bottom portion;
   a base layer included with the body portion and the bottom portion, the base layer has an inner portion with an inner surface at a carbonated product side of the preform, and an outer portion with an outer surface at an outer bottle side of the preform; and
   a passive $CO_2$ barrier layer between the inner portion and the outer portion of the base layer, the passive $CO_2$ barrier layer extending along the body portion to the bottom portion, and across the bottom portion, the passive $CO_2$ barrier layer is arranged closer to the inner surface than the outer surface;
   wherein:
   the passive $CO_2$ barrier layer is blended with polyethylene terephthalate (PET);
   the passive $CO_2$ barrier layer includes polyglycolic acid (PGA) at about 10 wt. % of the base layer and the passive $CO_2$ barrier layer combined;
   the passive $CO_2$ barrier layer decreases in thickness as the passive $CO_2$ barrier layer extends along the bottom portion such that the passive $CO_2$ barrier layer is most thin at the axial center of the bottom portion;

the container is configured to be filled at a gas fill volume of 1.5 g.v. resulting in 19% $CO_2$ loss over 40 weeks or less of shelf life;

the carbonated beverage container formed from the preform includes a container wall having the passive $CO_2$ barrier layer between the inner portion and the outer portion of the base layer, the passive $CO_2$ barrier layer is 5%-40% of an overall thickness of the container wall; and a midpoint of the passive $CO_2$ barrier layer is spaced apart from the inner surface of the base layer by 20-40% of the overall thickness of the container wall.

2. The preform of claim 1, wherein the base layer is a polyethylene terephthalate (PET) base layer.

3. The preform of claim 1, wherein the preform is configured to form a carbonated soft drink container sized from 8 oz to 2 L.

4. The preform of claim 1, wherein of a combined weight percentage of the base layer and the passive $CO_2$ layer: the inner portion of the base layer is 10 to 45 wt. %; and the outer portion of the base layer is at least 50 wt. %.

5. A carbonated beverage container comprising:
a finish defining an opening;
a body portion extending from the finish;
a bottom portion at an end of the container opposite to the finish, a longitudinal axis of the container extends through an axial center of the bottom portion;
a base layer included with the body portion and the bottom portion, the base layer has an inner portion with an inner surface at a carbonated product side of the container, and an outer portion with an outer surface at an outer bottle side of a preform from which the carbonated beverage container is formed;
a passive $CO_2$ barrier layer between the inner portion and the outer portion of the base layer, the passive $CO_2$ barrier layer extending along the body portion to the bottom portion, and across the bottom portion, the passive $CO_2$ barrier layer is arranged closer to the inner surface than the outer surface; and
a container wall including the passive $CO_2$ barrier layer between the inner portion and the outer portion of the base layer, the passive $CO_2$ barrier layer is 5%-40% of an overall thickness of the container wall, a midpoint of the passive $CO_2$ barrier layer is spaced apart from the inner surface of the base layer by 20-40% of the overall thickness of the container wall;

wherein:
the passive $CO_2$ barrier layer includes polyglycolic acid (PGA) at about 10 wt. % of the base layer and the passive $CO_2$ barrier layer combined;
the passive $CO_2$ barrier layer decreases in thickness as the passive $CO_2$ barrier layer extends along the bottom portion such that the passive $CO_2$ barrier layer is most thin at the axial center of the bottom portion; and
the container is configured to be filled at a gas fill volume of 1.5 g.v. resulting in 19% $CO_2$ loss over 40 weeks or less of shelf life.

6. The carbonated beverage container of claim 5, wherein the passive $CO_2$ barrier layer includes polyethylene terephthalate (PET).

7. The carbonated beverage container of claim 5, wherein the passive $CO_2$ barrier layer is polyglycolic acid (PGA) not blended with Polyethylene terephthalate (PET).

8. The carbonated beverage container of claim 5, wherein the preform is configured to form at least an 8 oz carbonated soft drink container.

9. The carbonated beverage container of claim 5, wherein the preform is configured to form a carbonated soft drink container sized from 8 oz to 2 L.

10. The carbonated beverage container of claim 5, wherein of a combined weight percentage of the base layer and the passive $CO_2$ barrier layer: the inner portion of the base layer is 10 to 45 wt. %; and the outer portion of the base layer is at least 50 wt. %.

* * * * *

UNITED STATES PATENT AND TRADEMARK OFFICE
CERTIFICATE OF CORRECTION

PATENT NO. : 11,951,654 B2
APPLICATION NO. : 16/771481
DATED : April 9, 2024
INVENTOR(S) : Farhan Ahmad et al.

It is certified that error appears in the above-identified patent and that said Letters Patent is hereby corrected as shown below:

On the Title Page

Abstract, Column 2, Line number 11, delete "CO2" and insert --$CO_2$--.

Abstract, page 2, Column 1, Line number 1, delete "CO2" and insert --$CO_2$--.

Abstract, page 2, Column 1, Line number 3, delete "CO2" and insert --$CO_2$--.

In the Claims

At Column 9, Claim number 1, Line number 6, delete "shelf life" and insert --shelf-life--.

At Column 9, Claim number 4, Line number 23, after "layer:", insert --¶--.

At Column 9, Claim number 4, Line number 24, after "and", insert --¶--.

At Column 10, Claim number 5, Line number 22, delete "shelf life" and insert --shelf-life;--.

At Column 10, Claim number 10, Line number 37, after "layer:", insert --¶--.

At Column 10, Claim number 10, Line number 38, after "and", insert --¶--.

Signed and Sealed this
Twelfth Day of November, 2024

Katherine Kelly Vidal
*Director of the United States Patent and Trademark Office*